United States Patent

Nakasuji et al.

Patent Number: 6,052,236
Date of Patent: Apr. 18, 2000

[54] LIGHT SOURCE EQUIPMENT OPTICAL SCANNER AND DATA READING APPARATUS USING THE SAME

[75] Inventors: Akio Nakasuji, Sanda; Toshihiro Yoshioka, Katano; Motonobu Yoshikawa, Osaka; Yoshiharu Yamamoto, Toyonaka, all of Japan

[73] Assignee: Matsushita Electric Industrial Co., Ltd., Japan

[21] Appl. No.: 09/099,103

[22] Filed: Jun. 18, 1998

[30] Foreign Application Priority Data

Jun. 19, 1997 [JP] Japan .................................. 9-178964

[51] Int. Cl.$^7$ ................................................ G02B 3/02
[52] U.S. Cl. ........................ 359/718; 359/719; 359/711; 359/205; 359/206; 359/668; 362/259; 235/462.42
[58] Field of Search ............................. 359/205, 206, 359/207, 647, 662, 668, 710, 711, 718, 719; 362/259; 235/462.42, 462.07

[56] References Cited

U.S. PATENT DOCUMENTS

| | | | |
|---|---|---|---|
| 4,253,735 | 3/1981 | Kawamura et al. | 359/668 |
| 4,585,296 | 4/1986 | Minoura et al. | 359/711 |
| 4,824,225 | 4/1989 | Nishioka | 359/718 |
| 4,842,388 | 6/1989 | Tanaka et al. | 359/718 |
| 5,081,639 | 1/1992 | Snyder et al. | 372/101 |
| 5,506,718 | 4/1996 | Takahashi | 359/205 |
| 5,756,981 | 5/1998 | Roustaei et al. | 235/462.42 |
| 5,790,576 | 8/1998 | Waarts et al. | 359/719 |
| 5,828,480 | 10/1998 | Nakamura et al. | 359/206 |

FOREIGN PATENT DOCUMENTS

| | | |
|---|---|---|
| 61-254915 | 11/1986 | Japan . |
| 1-109317 | 4/1989 | Japan . |
| 4-305615 | 10/1992 | Japan . |
| 6-110009 | 4/1994 | Japan . |
| 8-55178 | 2/1996 | Japan . |

*Primary Examiner*—Loha Ben
*Attorney, Agent, or Firm*—Parkhurst & Wendel, L.L.P.

[57] ABSTRACT

The light source equipment is provided with a light source and an anamorphic single lens. The anamorphic single lens has different refracting powers in the x and y directions orthogonal to each other, and converts a light from the light source to a light beam in a required state. Farther the anamorphic single lens satisfies the following equation:

$$0.3 < 2 \cdot f_y \cdot \tan(\theta_y/2) < 0.7 f_y > f_x$$

where $f_x$ is a focal length in the x direction, $f_y$ is a focal length in the y direction, and $\theta_y$ is a half angular divergence of radiant intensity of the light in the y direction.

27 Claims, 8 Drawing Sheets

LIGHT SOURCE EQUIPMENT OPTICAL SCANNER AND DATA READING APPARATUS USING THE SAME

BACKGROUND OF THE INVENTION

1. Field of the Invention

The present invention relates to light source equipment which converts light outgoing from a light source such as a semiconductor laser to a light beam having a required distribution light intensity, and in particular it relates to light source equipment, an optical scanner and data reading apparatus for which it is necessary to provide a light beam whose beam diameter in its optical axis direction is unchanged.

2. Description of the Related Art

Recently, a bar code reader which is able to read bar code information has widely been used for commodity control, etc. It is requested that in a current handy type laser bar code reader such an optical system is employed in which the $1/e^2$ diameter of a light intensity distribution on the scanning surface is greater in a direction (subscanning direction) orthogonal to the main scanning direction that in a scanning direction (main scanning direction), and with little change in the beam diameter in the optical axis direction is a little. According to a laser bar code reader which satisfies such requirements, it is possible to read a bar code recorded with long lines in the subscanning direction in a wide range in the optical axis direction and also possible to attempt to decrease noise.

Semiconductor lasers which are cheap in cost are mostly used light source for bar code readers. However, it causes a problem in that the astigmatic interval and radiation expanding angle are different among the respective components of a semiconductor laser. Conventionally, some light source equipment in which the astigmatic interval and radiation expanding angle are corrected are disclosed in technical literature.

It is disclosed that the astigmatic interval is corrected by using a cylindrical lens in the U.S. Pat. Nos. 4,253,735, 5,081,639, etc., a prism in Japanese Laid-open Patent Publication No. 110,009 of 1994, and a scanning mirror having a refracting power in Japanese Laid-open Patent Publication No. 55,178 of 1996.

Furthermore, a technique for adjusting the radiation expanding angle of a laser by a single lens is disclosed by Japanese Laid-open Patent Publication Nos. 254,925 of 1986, 109,317 of 1989, and 305,615 of 1992.

However, in a method using a cylindrical lens and a prism, there are some problems wherein the number of components is increased to cause the production cost to also increase and therein lies the difficulty in downsizing. Furthermore, the processing of a scanning mirror with refracting power is difficult without increasing production costs.

Still furthermore, there were some conventional single lenses for adjusting the radiation angle, in which the change in the beam diameter in the optical axis direction could not be decreased since there was an objective of improving the optical utilization efficiency.

SUMMARY OF THE INVENTION

The present invention was developed in view of the abovementioned situations, and it is therefore an object of the invention to provide light source equipment, an optical scanner and data reading apparatus which are able to achieve the downsizing thereof and to reduce the production cost with changes in the beam diameter with the optical axis direction suppressed, and to read information such as bar codes recorded with long lines in the subscanning direction in a wide range in the optical axis direction.

Light source equipment of the present invention comprises light source and an anamorphic single lens which has different refracting powers in the respective directions. Where it is assumed that one direction where the beam diameter of a light beam emitted from the light source equipment is smaller is "x" direction, and the other direction, orthogonal to the "x" direction, where the beam diameter is greater is "y" direction, the anamorphic single lens satisfies the following conditional equation where the focal length in the x direction is fx, the focal length in the y direction is fy, and the half angular divergence of radiant intensity of light beams from the light source is θy.

$$0.3<2\cdot fy\cdot\tan(\theta y/2)<0.7 fy>fx$$

If the $[2\cdot fy\cdot\tan(\theta y/2)]$ is less than the lower end of the conditional equation, the change in the beam diameter in the y direction of the optical axis direction is increased, and if the $[2\cdot fy\cdot\tan(\theta y/2)]$ is greater than the upper end thereof, the beam diameter is increased as a whole although it is possible to make the change of the beam diameter smaller. According to the invention, it is possible to prevent the change of the y direction beam diameter from becoming greater and the entire beam from becoming larger.

Light source equipment is provided with a light source having different angles of radiation in the x and y directions orthogonal to each other, and an anamorphic single lens, having different refracting powers in the respective orthogonal directions, into which light beams are made incident from the light source. The abovementioned light source meets a conditional equation of θy<θx where the half angular divergence of the radiant intensity in the x direction is θx and the half angular divergence of the radiant intensity in the y direction is θy, and the abovementioned anamorphic single lens is such that the incidence surface thereof has a negative refracting power in the y direction and is a toric surface having a positive refracting power in the x direction, and if the focal length in the x direction is fx and that in the y direction is fy, the same lens meets the following conditional equation.

$$0.3<2\cdot fy\cdot\tan(\theta y/2)<0.7 fy>fx$$

According to the invention, since it is possible to design the focal length fx in the x direction independently from that in the y direction, it is possible to improve the optical utilization efficiency while meeting the beam diameter, in comparison with a lens constructed of a cylindrical surface and an axial symmetry aspheric surface.

DESCRIPTION OF THE PREFERRED EMBODIMENTS

Hereinafter, a detailed description is given of preferred embodiments of the invention with reference to the accompanying drawings.

(First Embodiment)

Figure 1:
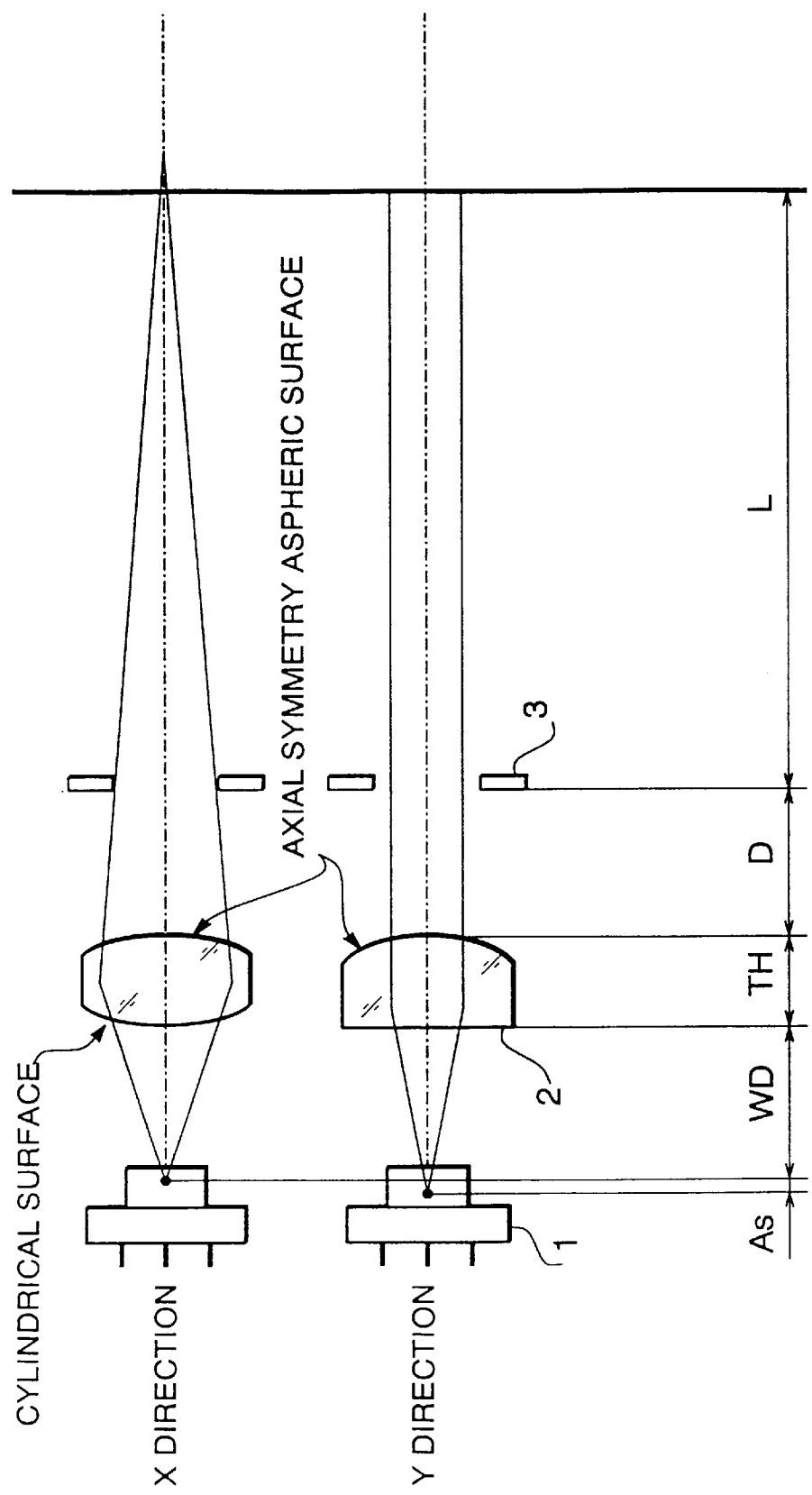
FIG. 1 is a configurational view of light source equipment according to a first embodiment of the invention.

FIG. 1 is a configurational view of light source equipment according to a first embodiment of the invention.

This embodiment is a design example which aims at satisfying the conditions that the beam diameter ($1/e^2$ intensity) in the x direction is 0.4 mm or less and the beam diameter in the y direction is from 0.4 mm through 1.2 mm in a range of about 170 mm in the optical axis direction.

In FIG. 1, 1 is a semiconductor laser; 2 is an anamorphic single lens, the emission surface of which is an axial symmetry aspheric surface on a cylindrical surface whose incidence surface has a refracting power in only the x direction; and 3 is a circular lens stop in which the beam diameter in the x direction is able to meet the required performance. The semiconductor laser 1 has a wavelength λ=670 nm, astigmatic interval As=5 μm, angle θy of horizontal radiation (half angular divergence)=6 through 8 degrees, and angle θx of vertical radiation (half angular divergence)=25 through 35 degrees, and is disposed so that the x direction has a greater angle of radiation.

Next, detailed numerical examples and arrangements of an anamorphic single lens are shown in Table 1 to Table 3. In the Tables, fx is a focal length (mm) in the x direction; fy is a focal length (mm) in the y direction; RDx1 is a radius (mm) in the x direction on the incidence surface; RDy1 is a radius (mm) in the y direction on the incidence surface; RD2 is a radius (mm) on the emission surface; CC is a conical constant of the emission surface; TH is the center thickness (mm); WD is an operating distance including a cover glass 0.25 mm thick having a refractive index of 1.49; D is a range (mm) from the lens emission surface to the lens stop; APw is a lens stop diameter (mm); λ is a design wavelength (mm); As is an astigmatic interval (mm) n is a refractive index of nitric material; and L is a range (mm) from the lens stop to an image plane. Furthermore, the axial symmetry aspheric surface profile is expressed in the following equation where a sag from the top of a plane at a distance p (mm) from the symmetrical axis is z (mm) with the advancement direction of a light beam made positive.

$$Z = \frac{\frac{P^2}{RD2}}{1 + \sqrt{1 - (1+CC)\left(\frac{P}{RD2}\right)^2}}$$

TABLE 1

| fx | 2.847 | fy | 3.0 |
|---|---|---|---|
| RDx1 | 16.0 | RDy1 | ∞ |
| RD2 | −1.535 | CC | −5.71138e−01 |
| TH | 2.0 | WD | 1.715 |
| D | 3.0 | APw | 0.670 |

TABLE 1-continued

| λ | 670 | As | 0.005 |
|---|---|---|---|
| n | 1.511567 | | |
| L | 83~250 | | |

TABLE 2

| fx | 3.057 | fy | 3.2 |
|---|---|---|---|
| RDx1 | 20.50 | RDy1 | ∞ |
| RD2 | −1.637 | CC | −5.72720e−01 |
| TH | 2.0 | WD | 1.925 |
| D | 3.0 | APw | 0.680 |
| λ | 670 | As | 0.005 |
| n | 1.511567 | | |
| L | 83~250 | | |

TABLE 3

| fx | 3.351 | fy | 3.5 |
|---|---|---|---|
| RDx1 | 25.0 | RDy1 | ∞ |
| RD2 | −1.790 | CC | −5.78310e−01 |
| TH | 2.0 | WD | 2.229 |
| D | 3.0 | APw | 0.680 |
| λ | 670 | As | 0.005 |
| n | 1.511567 | | |
| L | 83~250 | | |

In any one of the numerical examples, the emission light beam in the x direction and emission light beam in the y direction are slightly divergence light.

Next, the results of a simulation of changes in light beam ($1/e^2$ intensity) in the respective directions in the optical axis direction including unevenness of the angle of radiation are shown. Furthermore, taking Fresnel refraction into consideration, the simulation was carried out with the lens made aberration-free.

Figure 2A:
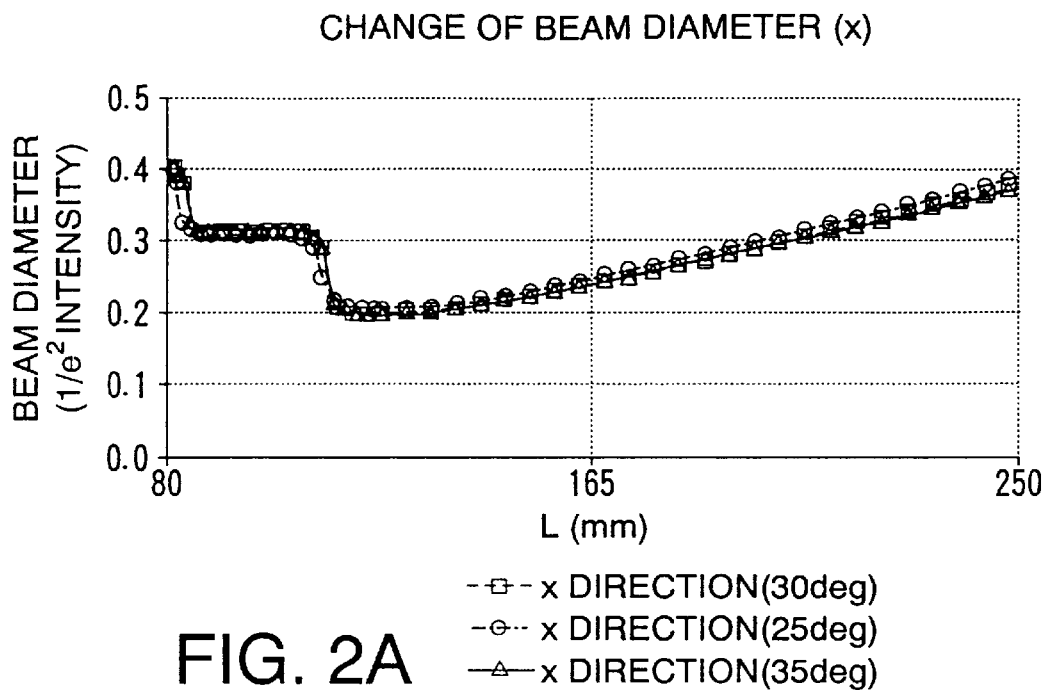
FIGS. 2A and 2B are graphs showing changes in the beam diameter according to the first numerical example.
Figure 2B:
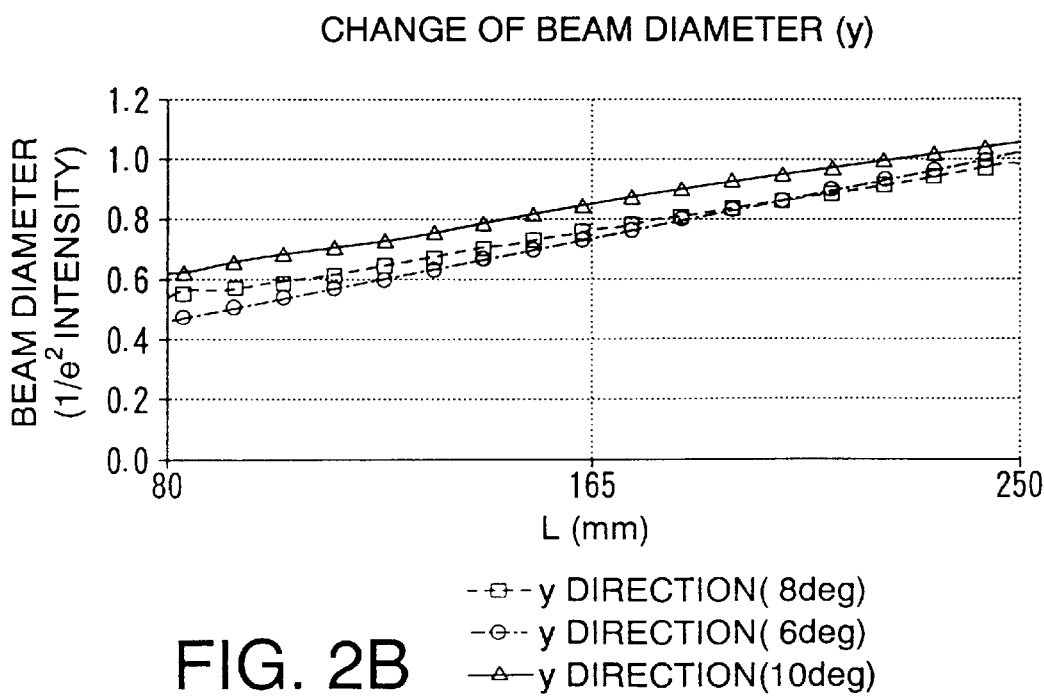
Figure 3A:
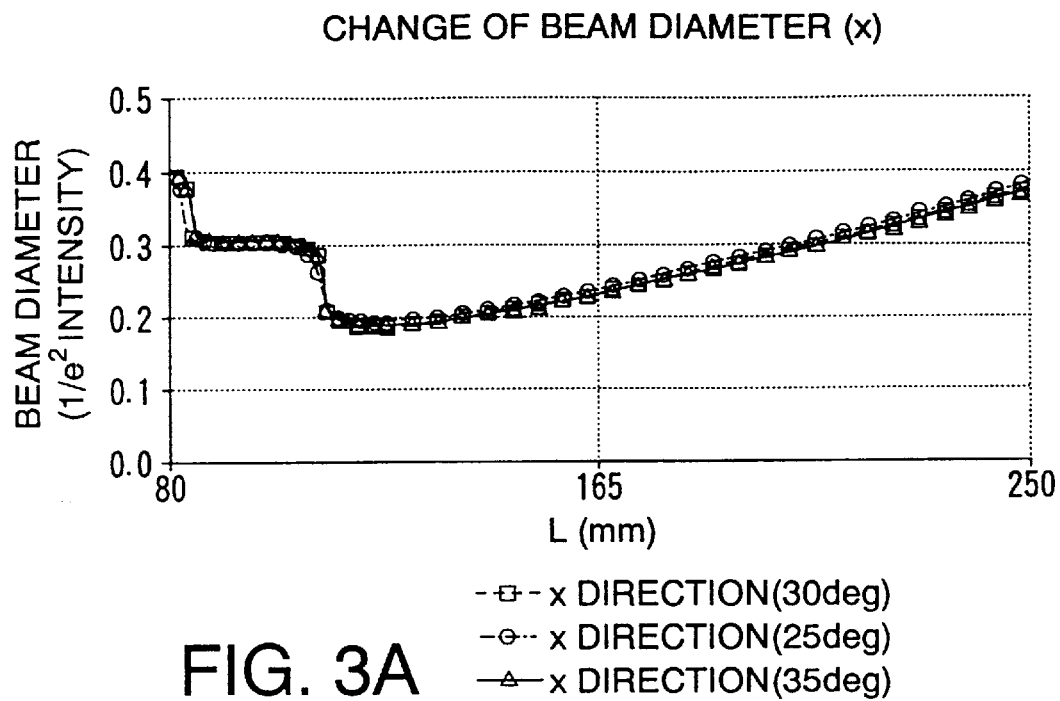
FIGS. 3A and 3B are graphs showing changes in the beam diameter according to the second numerical example.
Figure 3B:
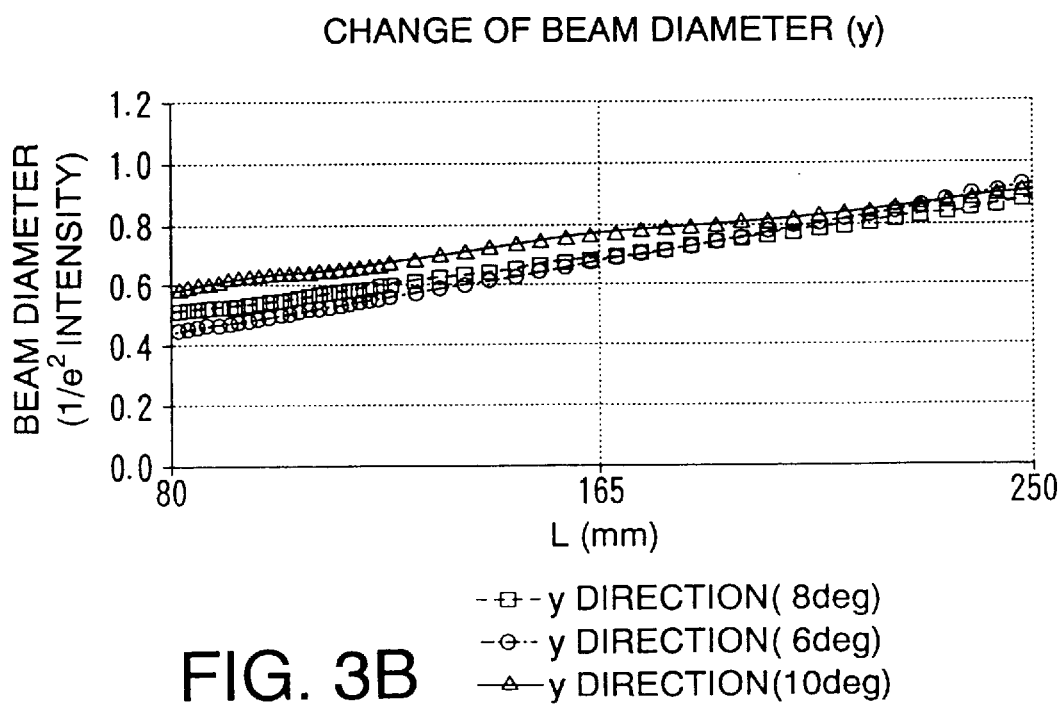
Figure 4A:
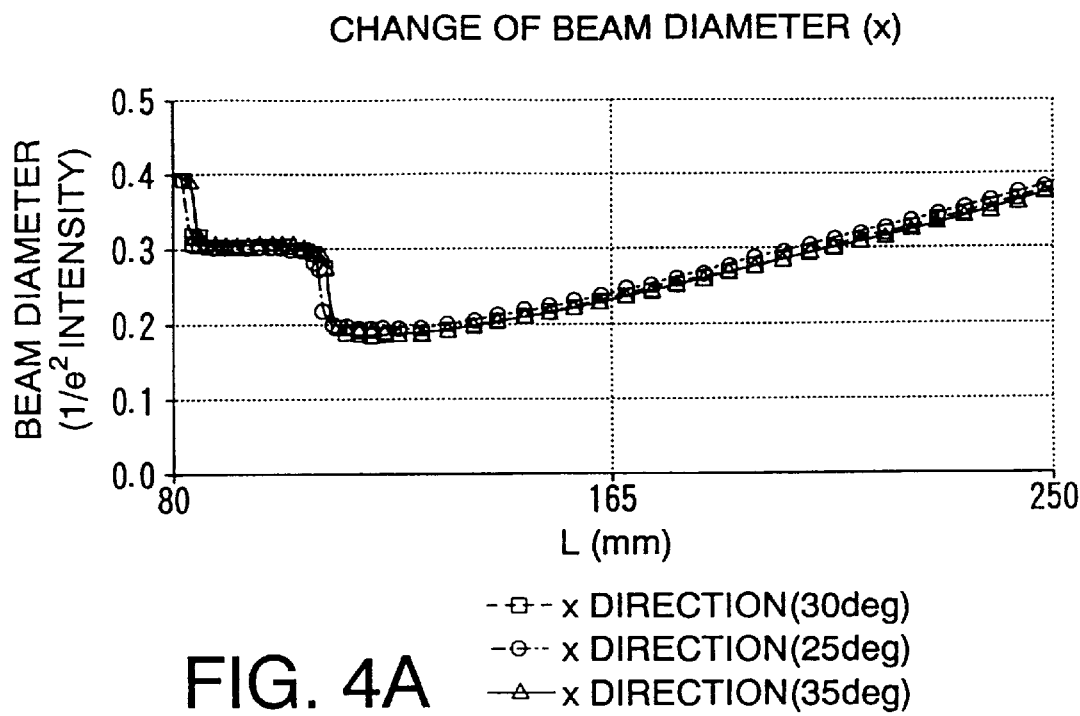
FIGS. 4A and 4B are graphs showing changes in the beam diameter according to the third numerical example.
Figure 4B:
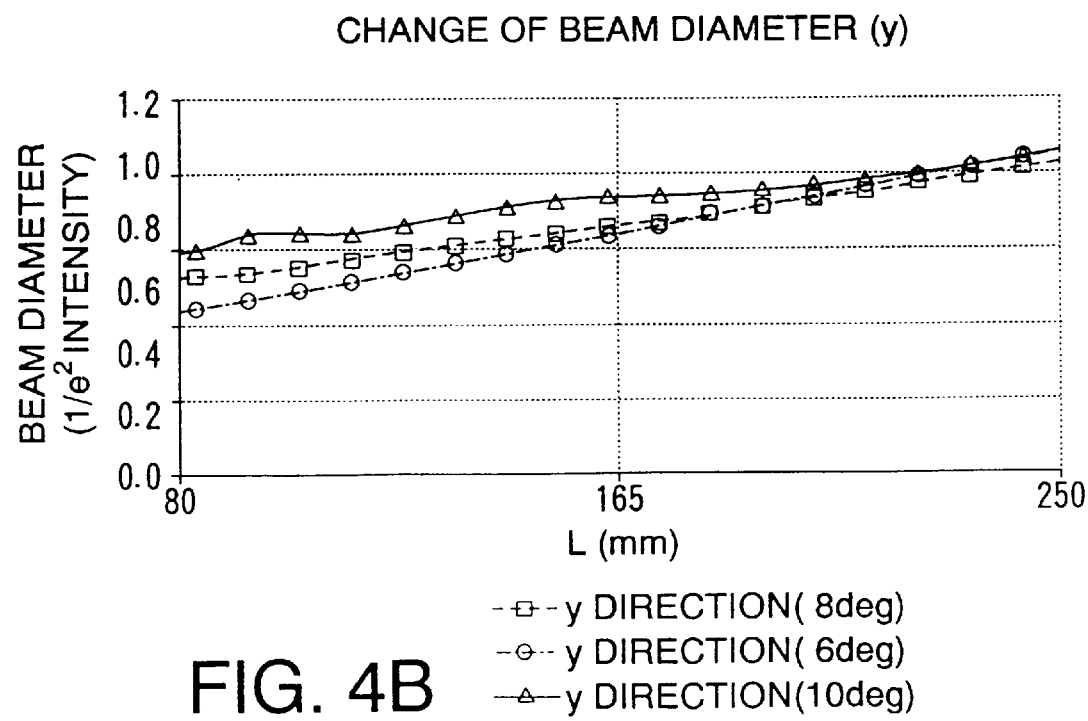

FIG. 2A shows the beam diameter in the x direction with regard to the numerical example 1, FIG. 2B shows the beam diameter in the y direction with regard to the numerical example 1, FIG. 3A shows the beam diameter in the x direction with regard to the numerical example 2, FIG. 3B shows the beam diameter in the y direction with regard to the numerical example 2, FIG. 4A shows the beam diameter in the x direction with regard to the numerical example 3, FIG. 4B shows the beam diameter in the y direction with regard to the numerical example 3.

Taking the unevenness of the angle of radiation into consideration, the light utilization efficiency of light beam passing through a lens stop is 25 through 42% in the numerical example 1, 23 through 40% in the numerical example 2, and 20 through 35% in the numerical example 3. Furthermore, although the shape of the incidence surface is made a cylindrical surface having a positive refracting power in the x direction, it may be a cylindrical surface having a negative refracting power in the y direction.

According to the first preferred embodiment thus constructed, a light source equipment is constructed of a semiconductor laser and an anamorphic single lens, wherein an anamorphic single lens which meets the abovementioned conditional equation is disposed so that a divergent light beam from the light source is converted to a parallel beam or a divergence beam in the y direction and to a convergence beam in the x direction and a lens stop which obtains a required distribution light intensity is disposed. Therefore, it is possible to meet the conditions that the beam diameter ($1/e^2$ intensity) in the x direction is 0.4 mm or less and the beam diameter in the y direction is from 0.4 mm to 1.2 mm in a range of about 170 mm in the optical axis direction. That is, it is possible to obtain an appointed beam intensity profile in which the beam diameter is greater in the y direction than in the x direction in a required optical axis range.

Furthermore, since the anamorphic single lens surface profile is constructed so that its incidence surface is made a cylindrical surface having a positive refracting power in only the x direction or a cylindrical surface having a negative refracting power in only the y direction and its emission surface is made an axial symmetry aspheric surface, it is possible to produce light source equipment having the abovementioned excellent performance characteristics at a comparatively low cost.

Furthermore, the incidence surface is made a cylindrical surface, the emission surface is made an axial symmetry aspheric surface and the emission surface is made to have a great refracting power, wherein the out-of-axis performance can be improved.

Furthermore, since the light source is a semiconductor laser, it has different angles of radiation in the x and y directions, since $\theta y < \theta x$ is established where the half angular divergence of the radiant intensity in the x direction is $\theta x$ (deg.), and that in the y direction is $\theta y$ (deg.), the light utilization efficiency can be improved.

(Second Embodiment)

Figure 5:
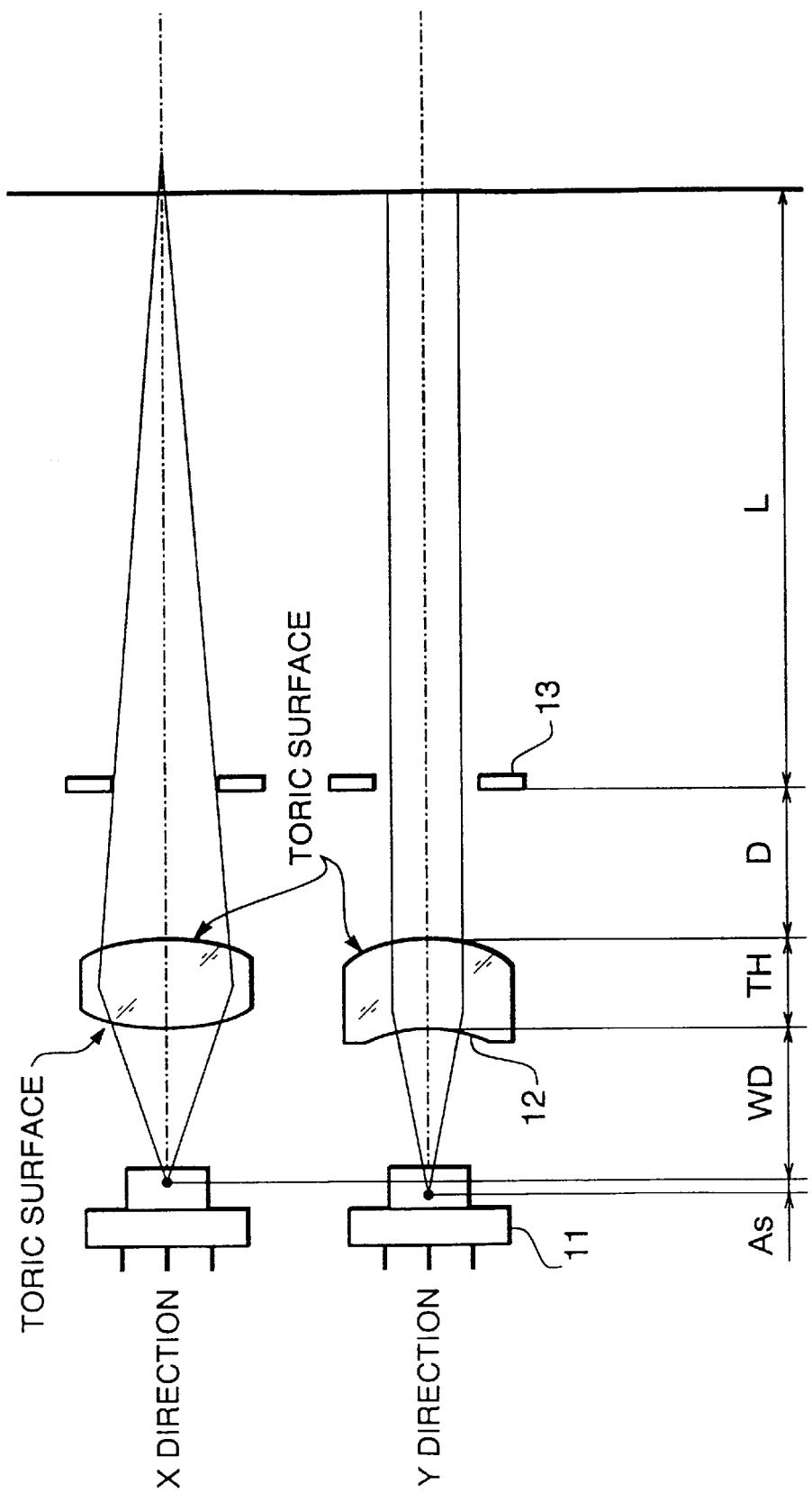
FIG. 5 is a configurational view of light source equipment according to a second embodiment of the invention.

FIG. 5 is a configurational view of a light source device according to a second preferred embodiment of the invention. This embodiment is a design example which aims at meeting the conditions that the beam diameter ($1/e^2$ intensity) in the x direction is 0.4 mm or less and the beam diameter in the y direction is from 0.4 mm through 1.2 mm in a range of about 170 mm in the optical axis direction.

In FIG. 5, 11 is a semiconductor laser; 12 is an anamorphic single lens having a toric surface, the incidence surface of which has a refracting power which is positive in the x direction and negative in the y direction and the emission surface of which has a refracting power which is positive in the x direction and negative in the y direction; and 13 is a circular lens stop disposed so that the beam diameter in the x direction meets a required performance. The semiconductor laser 11 has a wavelength $\lambda=670$ nm, astigmatic interval As=5 μm, angle $\theta y$ of horizontal radiation (half angular divergence)=6 through 8 degrees, and angle $\theta x$ of vertical radiation (half angular divergence)=25 through 35 degrees, and is disposed so that the x direction has a greater angle of radiation.

Next, Table 4 and Table 5 show detailed numerical examples of an anamorphic single lens, wherein fx is a focal length (mm) in the x direction; fy is a focal length (mm) in the y direction; RDx1 is a radius (mm) in the x direction on the incidence surface; RDy1 is a radius (mm) in the y direction on the incidence surface; CC1 is a conical constant of the radius in the x direction on the incidence surface; RDx2 is a radius (mm) in the x direction on the emission surface; RDy2 is a radius (mm) in the y direction on the emission surface; CC2 is a conical constant in the y direction on the emission surface; TH is the center thickness (mm); WD is an operating distance including cover glass 0.25 mm thick having a refractive index of 1.49; D is a range (mm) from the lens emission surface to the lens stop; APw is a lens stop diameter (mm); $\lambda$ is a design wavelength (mm) ; As is an astigmatic interval (mm); n is a refractive index of nitric material; and L is a range (mm) from the lens stop to an image plane. The toric profile of the incidence surface is a saddle type toric surface which is expressed by the following expression in which a sag from the top in the x-y coordinate system, in which the surface top is made the origin, is z (mm) for which the advancement direction of light beam is made positive.

$$Z = RDy1 - \frac{|RDy1|}{RDy1}\sqrt{\{RDy1 - f(x)\}^2 - y^2}$$

$$f(x) = \frac{\frac{x^2}{RDx1}}{1 + \sqrt{1 - (1+CC1)\left(\frac{x}{RDx1}\right)^2}}$$

Furthermore, the toric surface of the emission surface is a barrel type toric surface expressed by the following equation as in the above.

$$Z = RDx2 - \frac{|RDx2|}{RDx2}\sqrt{\{RDx2 - f(y)\}^2 - x^2}$$

$$f(y) = \frac{\frac{y^2}{RDy2}}{1 + \sqrt{1 - (1+CC2)\left(\frac{y}{RDy2}\right)^2}}$$

TABLE 4

| fx | 2.5 | fy | 3.2 |
|---|---|---|---|
| RDx1 | 2.584 | RDy1 | −5.254 |
| RD2 | −1.873 | RDy2 | −1.410 |
| CC1 | −2.42831e+01 | CC2 | −4.44445e−01 |
| TH | 2.0 | WD | 1.711 |
| D | 3.0 | APw | 0.700 |
| λ | 670 | As | 0.005 |
| n | 1.512190 | L | 83~250 |

TABLE 5

| fx | 2.0 | fy | 3.2 |
|---|---|---|---|
| RDx1 | 1.205 | RDy1 | −3.932 |
| RD2 | −2.987 | RDy2 | −1.356 |
| CC1 | −.12306e+00 | CC2 | −4.37142e−01 |
| TH | 2.0 | WD | 1.650 |
| D | 3.0 | APw | 0.700 |
| λ | 670 | As | 0.005 |
| n | 1.512190 | L | 83~250 |

In any one of the numerical examples, the emission beam in the x direction is a convergence light, and the emission beam in the y direction is slightly divergence light.

Next, the results of simulation of changes in the optical axis direction of the beam diameter ($1/e^2$ intensity) in the respective directions including unevenness of the angle of radiation are shown. Furthermore, taking Fresnel refraction into consideration, the simulation was carried out with the lens made aberration-free.

Figure 6:
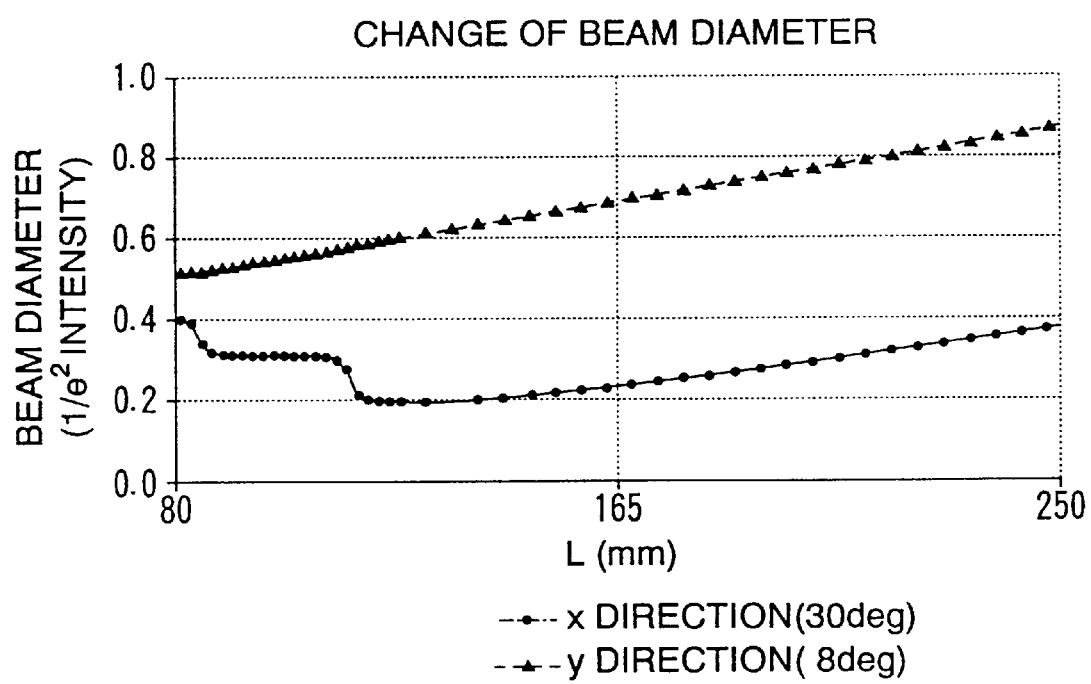
FIG. 6 is a graph showing changes in the beam diameter according to the fourth numerical example.

FIG. 6 shows the beam diameter in the x direction, and that in the y direction according to the numerical example 4. Taking the unevenness in the angle of radiation into consideration, the light utilization efficiency of light beam passing through the lens stop is 31 to 50% for the numerical example 4 and 38 to 60% for the numerical example 5. Therefore, the light utilization efficiency of the second embodiment is higher than that of the first embodiment. Furthermore, although the emission surface is made a toric surface, an axial symmetry aspheric surface may be acceptable, depending on some specifications.

According to the second preferred embodiment thus constructed, since the profile of the anamorphic single lens is constructed so that its incidence surface is a toric surface having a negative refracting power in the y direction and a positive refracting power in the x direction and its emission surface is a toric surface having a positive refracting power in the y direction, it is possible to design the focal length fx in the x direction independently from that in the y direction. Therefore, it is possible to improve the light utilization efficiency 10 to 30% in the case of the abovementioned numerical examples, in comparison with a lens constructed of a cylindrical surface and an axial symmetry aspheric surface.

(Third Embodiment)

Figure 7:
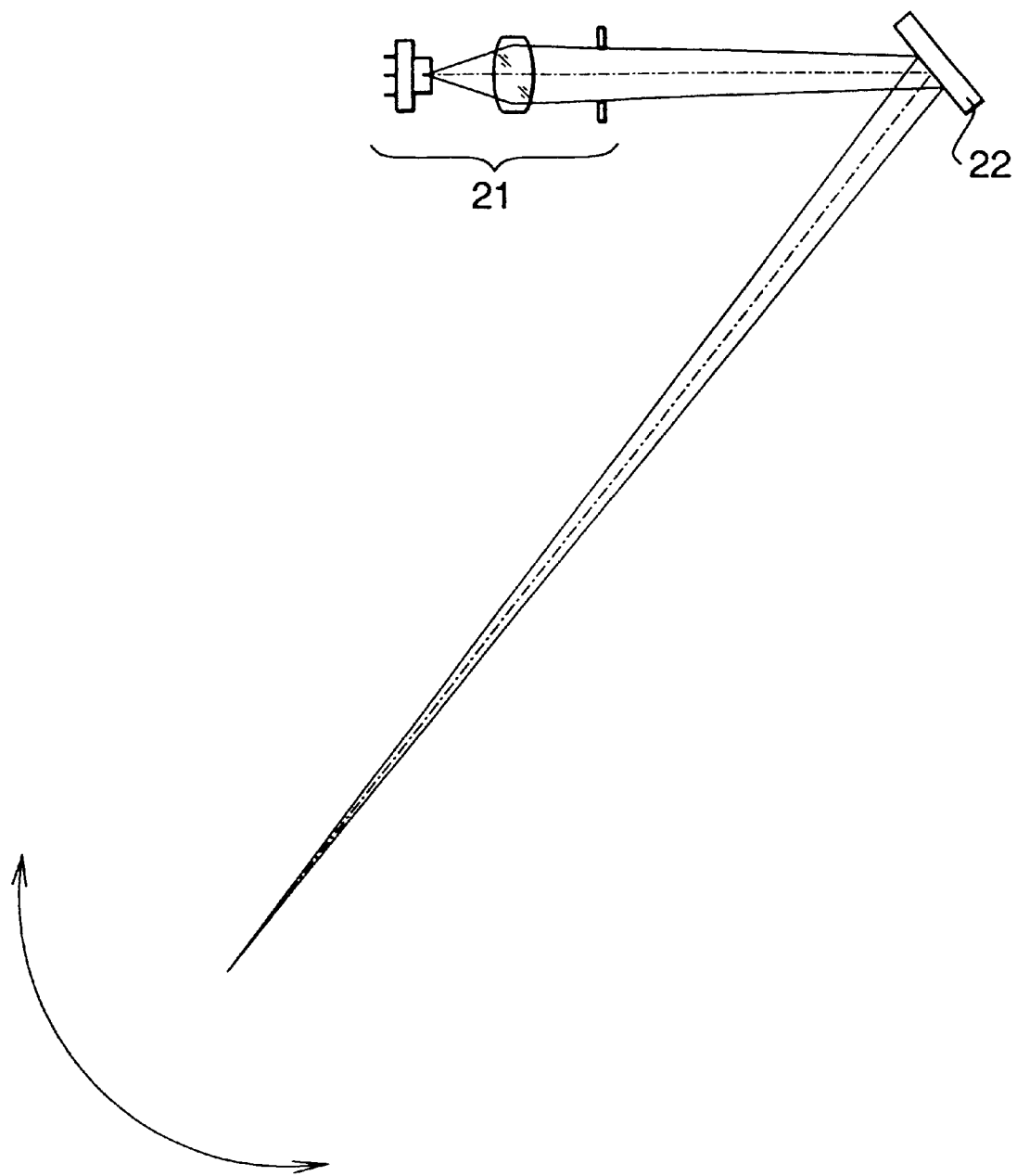
FIG. 7 is a configuration view of an optical scanner according to a third embodiment of the invention.

FIG. 7 is a configurational view of an optical scanner according to a third preferred embodiment of the invention.

In FIG. 7, 21 is light source equipment illustrated in the first preferred embodiment and 22 is a scanning mirror for scanning with a light beam in the x direction. This equipment is optical scanning equipment which meets the conditions that, with respect to the required distribution of light intensity on a scanning surface, the beam diameter ($1/e^2$ intensity) in the x direction is 0.4 mm or less and the beam diameter in the y direction is 0.4 mm to 1.2 mm in a range of about 170 mm in the optical axis direction.

According to the third preferred embodiment thus constructed, since light source equipment according to the first embodiment is used for an optical scanner, the intensity distribution differs in the orthogonal direction on the scanning surface, wherein even though the position of the scanning surface changes in the optical axis direction, such an effect can be obtained, by which the change in the beam diameter can be reduced and become smaller.

(Fourth Embodiment)

Figure 8:
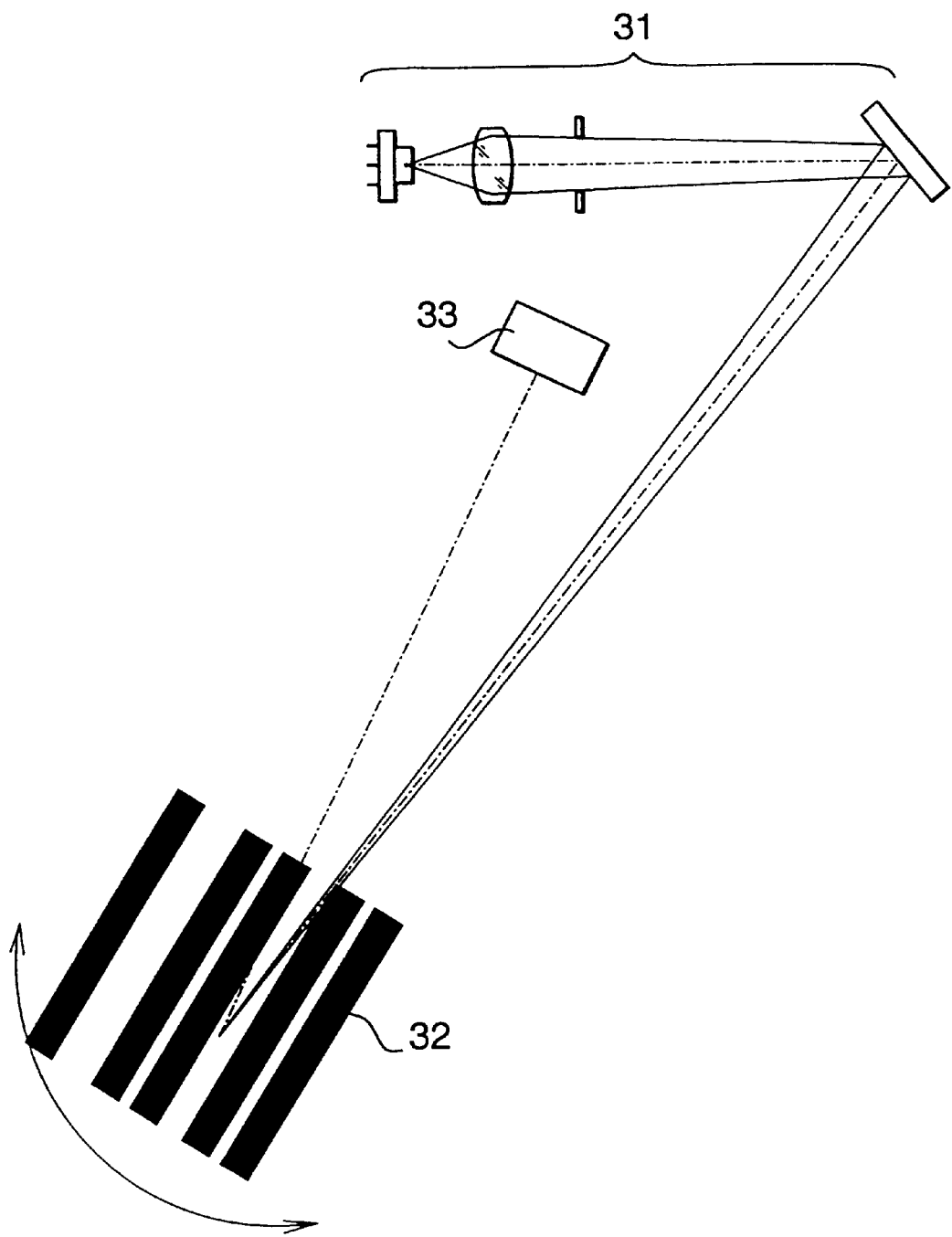
FIG. 8 is a configurational view of data reading apparatus according to a fourth embodiment of the invention.

FIG. 8 is a configurational view of a data reading apparatus according to a fourth preferred embodiment of the invention.

In FIG. 8, 31 is an optical scanner illustrated in the third preferred embodiment; 32 is a recorded bar code; and 33 is a sensor composed of a light condenser optical system and an optical sensor.

As the bar code 32 is read by scanning it with a light beam in the x direction with the lengthwise direction of the bar code coincident with the y direction, it is possible to easily read data since the range is wide, which meets the conditions that the beam diameter ($1/e^2$ intensity) in the x direction is 0.4 mm or less and the beam diameter in the y direction is 0.4 mm to 1.2 mm.

With the fourth preferred embodiment thus constructed, it is possible to scan with a light beam having different light intensities in the respective directions, which is optimal to read data on the information recorded surface such as a bar code, etc., and furthermore, even though the position of the information recorded surface in the optical axis direction is changed, it is possible to read data with errors minimized since the beam diameter change is slight.

What is claimed is:

1. Light source equipment comprising:

a light source; and a single lens, having different refracting powers in the x and y directions orthogonal to each other, for converting light incident from said light source to a light beam in a required state and emitting the converted light beam;

wherein said single lens meets the following equation:

$$0.3 < 2 \cdot fy \cdot \tan(\theta y/2) < 0.7 fy > fx$$

where fx is a focal length in the x direction, fy is a focal length in the y direction, and θy is a half angular divergence of radiant intensity of the light coming from the light source in the y direction.

2. The light source equipment according to claim 1, further comprising a lens stop, disposed at the emission side of said single lens, for converting said light beam to a required intensity distribution.

3. The light source equipment, according to claim 1, wherein said single lens receives a diverging light beam incident from said light source, and converts the incident light beam to a parallel beam or a divergence beam in the y direction and converts it to a convergence beam in the x direction.

4. The light source equipment according to claim 1, wherein said single lens has a cylindrical surface on at least one of either the incidence surface or emission surface, said cylindrical surface has a positive refracting power in only the x direction.

5. The light source equipment according to claim 4, wherein said single lens has a cylindrical surface on the incidence surface which has a positive refracting power in only the x direction.

6. The light source equipment according to claim 1, wherein said single lens has a cylindrical surface on at least one of either the incidence surface or emission surface which has a negative refracting power in only the y direction.

7. The light source equipment according to claim 6, wherein said single lens has a cylindrical surface on the incidence surface which has a negative refracting power in only the y direction.

8. The light source equipment according to claim 1, wherein said single lens has an axial symmetry aspheric surface on at least one of either the incidence surface or emission surface of said single lens.

9. The light source equipment according to claim 8, wherein the emission surface of said single lens is an axial symmetry aspheric surface.

10. The light source equipment according to claim 1, wherein said light source has different angles of radiation in the x direction and the y direction and satisfies the following equation $$\theta y < \theta x$$

where the half angular divergence of the radiant intensity in the x direction is θx and the half angular divergence of the radiant intensity in the y direction is θy.

11. The light source equipment according to claim 1, wherein said light source comprises a semiconductor laser.

12. An optical scanner comprising:

light source equipment described in claim 1; and scanning means for scanning by swinging a light beam emitted from said light source equipment.

13. Light source equipment comprising:

a light source having different angles of radiation in the x direction and y direction orthogonal to each other; and a single lens, having different refracting powers in the directions orthogonal to each other, for converting light incident from said light source to a light beam in a required state;

wherein said light source satisfies the following equation;

$$\theta y < \theta x$$

and, said single lens has a toric surface on the incidence surface which has a negative refracting power in the y direction and a positive refracting power in the x direction, and satisfies the following equation:

$$0.3 < 2 f_y \cdot \tan(\theta_y/2) < 0.7 f_y > f_x$$

where $\theta_x$ is a half angular divergence of the radiant intensity in the x direction of the light source, $\theta_y$ is a half angular divergence of the radiant intensity in the y direction of the light source, $f_x$ is a focal length in the x direction, and $f_y$ is a focal length in the y direction.

14. The light source equipment according to claim 13, wherein said single lens has a toric surface or an axial symmetry aspheric surface on the emission surface which has a positive refracting power in the y direction.

15. The light source equipment according to claim 13, wherein said light source comprises a semiconductor laser.

16. A data reading apparatus for reading information recorded on a recorded surface by scanning said recorded surface with a light beam, comprising:

an optical scanner for scanning said recorded surface with a light beam; and sensing means for sensing reflection light from said recorded surface scanned;

wherein said optical scanner is composed of light source equipment including a light source and a single lens having different refracting powers in the respective directions orthogonal to each other; and scanning means for scanning with a light beam.

17. The data reading apparatus according to claim 16, wherein said single lens meets the following equation:

$$0.3 < 2 f_y \cdot \tan(\theta_y/2) < 0.7 f_y > f_x$$

where $f_x$ is a focal length in one direction, $f_y$ is a focal length in the other direction, and $\theta_y$ is a half angular divergence of radiant intensity of the light coming from the light source in the other direction.

18. The data reading apparatus according to claim 16, wherein said single lens converts a divergence beam incident from said light source to a convergence beam in a main scanning direction which is a scanning direction and converts it to a parallel beam or a divergence beam in the subscanning direction vertical to the scanning direction.

19. The data reading apparatus according to claim 16, wherein said single lens has a cylindrical surface on at least one of either the incidence surface or emission surface which has a positive refracting power in only the x direction.

20. The data reading apparatus according to claim 16, wherein said single lens has a cylindrical surface on the incidence surface which has a positive refracting power in only the x direction.

21. The data reading apparatus according to claim 16, wherein said single lens has a cylindrical surface on at least one of either the incidence surface or emission surface which has a negative refracting power in only the y direction.

22. The data reading apparatus according to claim 16, wherein said single lens has a cylindrical surface on the incidence surface which has a negative refracting power in only the y direction.

23. A data reading apparatus according to claim 16, wherein said single lens is such that at least one of either the incidence surface or emission surface thereof is an axial symmetry aspheric surface.

24. The data reading apparatus according to claim 16, wherein said single lens has an axial symmetry aspheric surface on the emission surface.

25. The data reading apparatus according to claim 16, wherein said light source is such that the angle of radiation in the x direction is different from that in the y direction and satisfies the condition of $\theta_y < \theta_x$, where $\theta_x$ is a half angular divergence of the radiant intensity in the x direction, and $\theta_y$ is a half angular divergence of the radiant intensity in the y direction.

26. The data reading apparatus according to claim 16, wherein information recorded on a recording surface is a bar code.

27. The data reading apparatus according to claim 16, wherein the wavelength of said light source is in a visible range.

* * * * *